Aug. 6, 1963 L. R. FOOTE 3,100,268

SYMPATHETIC SILICON CONTROLLED RECTIFIER CIRCUIT

Filed Aug. 23, 1960

*INVENTOR.*

LAWRENCE R. FOOTE

*BY*

John B. Sponsler

United States Patent Office 3,100,268

Patented Aug. 6, 1963

3,100,268

SYMPATHETIC SILICON CONTROLLED RECTIFIER CIRCUIT

Lawrence R. Foote, Roanoke, Va., assignor to General Electric Company, a corporation of New York Filed Aug. 23, 1960, Ser. No. 51,401
10 Claims. (Cl. 307—88.5)

This invention relates to electrical power switching circuits incorporating solid state devices such as silicon controlled rectifiers.

More particularly the invention is concerned with extending the voltage limits of circuits wherein silicon controlled rectifiers are utilized for connecting a load to a supply source which exceeds the voltage rating of the solid state device.

It is an object of this invention, therefore, to provide an improved circuit for switching loads in high voltage electrical power devices operated by silicon controlled rectifiers.

The silicon controlled rectifier provides a reliable, high speed switching device for applications where contact sticking, wear and bounce, as encountered in relays and contactors, are objectionable. Because of the very fast switching time in these devices, approximating 1 microsecond, large blocks of power may be switched without danger of overheating the solid state device. A limitation of the device, however, is that its voltage rating must always exceed the peak voltage of the energizing source of electrical potential. For example, one type of silicon controlled rectified capable of switch 40 kilowatts will operate in circuits with peak voltages up to 300 volts. When higher voltage parameters are used two or more of these rectifiers may be placed in series; however, unless their firing times are identical, the load may not be switched properly or permanent damage may result to one or more of the silicon controlled rectifiers from exceeding the voltage rating.

It is another object of this invention, therefore, to provide a switching circuit in which positive switching of series connected silicon controlled rectifiers is effected.

The novel features of the invention are set forth with particularity in the appended claims. The invention itself, however, both as to its organization and method of operation, together with further objects and advantages thereof, may be best understood by referring to the following description and the accompanying drawing.

Referring to FIGURE 1 of the drawing there is shown a circuit for utilizing two controlled rectifiers in series to connect a load across a source of electrical supply having a voltage greater than the rating of either rectifier.

Figure 1:
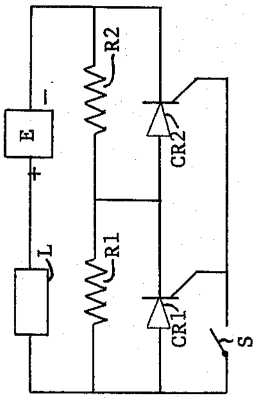

In FIGURE 1 a load L is connected to a voltage source E with a voltage divider comprised of two equal resistors R1 and R2, one resistor being connected across each of the controlled rectifiers CR1 and CR2. When the switch S is closed the gates of both rectifiers CR1 and CR2 are made positive to fire their respective rectifiers. Since potential is maintained across each rectifier by the arms R1 and R2, respectively, of the voltage divider, it is immaterial that both rectifiers firing times be identical, the voltage source E must not exceed the sum of the rated voltages of both controlled rectifiers.

Figure 2:
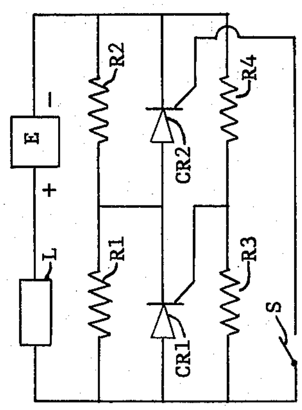
FIGURE 2 shows a modification of FIGURE 1 where sympathetic switching is incorporated according to the teaching of the invention.

FIGURE 2 is an improvement over FIGURE 1 having the additional advantage of providing a "back" bias voltage upon the second rectifier to insure its sequential firing only after the first or initiating rectifier has fired. In this circuit two equal resistors R1 and R2 are connected across a load L and the voltage source E with a pair of controlled rectifiers CR1 and CR2 connected across the resistors R1 and R2, respectively. The gate of the controlled rectifier CR1 is connected to a voltage divider composed of resistors R3 and R4, R3 having a higher value than R4. Consequently the midpoint of the resistors R1 and R2, to which the base of the rectifier CR1 is connected, will be at a higher potential than the midpoint of the resistors R3 and R4, to which the gate of rectifier CR1 is connected, and the gate of rectifier CR1 will be negatively biased.

When switch S (FIG. 2) is closed the gate of rectifier CR2 is made positive so that rectifier CR2 conducts, and current flows via voltage source E, load L, resistor R1, controlled rectifier CR2 to source E. Since the voltage across R2, shunted by rectifier CR2 in conducting condition, falls substantially to zero, the base of the rectifier CR1 is no longer at a higher potential than the gate of rectifier CR1, and the latter becomes conducting so that the load L is now connected to the voltage source E via the controlled rectifiers CR1 and CR2 in series. An external source may be used for initiating the action of rectifier CR2 in applying potential to its gate.

Figure 3:
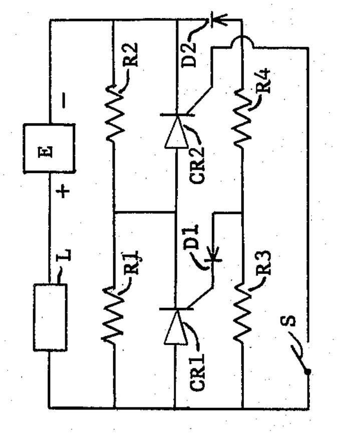
FIGURE 3 is similar to FIGURE 2, and is further provided with circuit components for specific alternating current operation.
Figure 4:
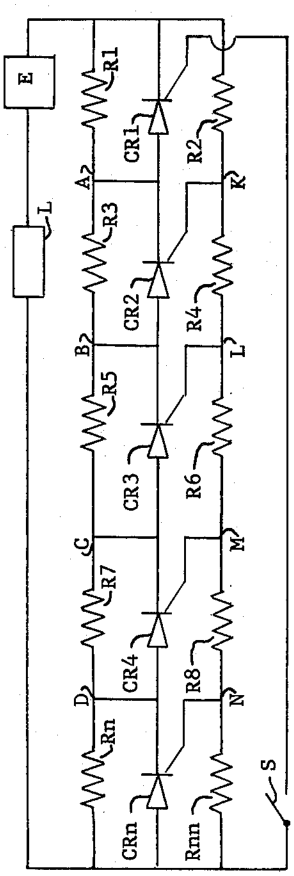
FIGURE 4 is an expansion of FIGURE 2 showing a plurality of controlled rectifiers in series sufficient to accommodate a greater supply voltage.

The circuit of FIG. 3 is similar to that of FIG. 2; however, the "back circuit" diodes D1 and D2 are included to insure that no gate current flows in rectifier CR1 and to prevent inverse voltage between the gate and cathode of rectifier CR1. This circuit may be used for alternating current operation, therefore.

Where the circuit voltage is many times the rated voltage of the controlled rectifier a cascaded system may be employed patterned after the circuit of FIG. 4. The number of controlled rectifiers required in series is determined by the supply voltage divided by the voltage rating of the rectifier plus one. FIG. 4 illustrates a series of five (5) controlled rectifiers following along the circuit of FIG. 2. Resistors R1, R3, R5, R7, and R*n* are all of equal value so that the supply voltage E is equally distributed across them, and across the controlled rectifiers CR1, CR2, CR3, CR4, and CR*n*. However the gates of the respective controlled rectifiers (except CR1) are all back biased since the values of the resistors R2, R4, R6, R8 and R*nn* are chosen so that point K is initially of lower potential than point A, point L lower than point B, point M lower than point C, and N lower than D. When the first controlled rectifier CR1 becomes conductive via potential applied to its gate through switch S, point A falls below point K, as explained in connection with FIG. 2, and rectifier CR2 becomes conductive as a result of potential applied to its gate thereby lowering the potential of point B below point L so that rectifier CR3 becomes conductive in a similar manner. In other words the controlled rectifiers successively become conductive by sympathetic action of their respective gate potentials. Consequently the load L is connected to the voltage supply E through the series of controlled rectifiers CR1, CR2, CR3, CR4 and CR*n* within a few microseconds by the consecutive operation of these rectifiers as described. Theoretically there is no limit to the number of controlled rectifiers that may be connected in series in the manner shown; however, practical requirements indicate that the total number of units so arranged is limited to more reasonable proportions consistent with rectifier operating conditions and circuit parameters.

While this invention has been explained and described with the aid of a particular embodiment thereof, it will be understood that the invention is not limited thereby and that many modifications will occur to those skilled in the art. It is therefore contemplated by the appended claims to cover all such modifications as fall within the scope and spirit of the invention.

What is claimed is:

1. A switching circuit for connecting a load to a potential source comprising two or more series connected solid state rectifiers, each rectifier being provided with a gate for initiating conduction thereof, means for supplying a triggering potential simultaneously to each said gate to initiate conduction, and a voltage divider across said source arranged to apply a proportionate amount of potential across each said rectifier whereby any rectifier of the series upon becoming conductive is maintained conducting until all said rectifiers become conductive.

2. A switching circuit for connecting a load to a potential source comprising two or more series connected solid state rectifiers, each rectifier being provided with a gate for initiating conduction thereof, a first voltage divider across said source arranged to apply a proportionate amount of said potential to each said rectifier, a second voltage divider across said source arranged to apply a predetermined amount of said potential to the said gate of each rectifier except the first of the series, the magnitude of the said potential to any said rectifier being more than to its corresponding gate, and means for initiating conduction of the said first rectifier of the series.

3. A switching circuit for connecting a load to a potential source comprising two or more series connected solid state rectifiers, each rectifier being provided with a gate for intiating conduction thereof, a first voltage divider across said source arranged to apply a proportionate amount of said potential to each said rectifier, a second voltage divider across said source arranged to apply a predetermined amount of said potential to the said gate of each rectifier except the first of the series, the magnitude of the said potential to any said rectifier being more than to its corresponding gate, and means for applying potential to the gate of the said first rectifier of the series to cause it to become conductive.

4. A switching circuit for connecting a load to a potential source comprising two or more series connected solid state rectifiers, each rectifier being provided with a gate for initiating conduction thereof, a first voltage divider across said source arranged to apply a proportionate amount of said potential to each said rectifier, a second voltage divider through a unidirectional device across said source arranged to apply a predetermined amount of said potential to the said gate of each rectifier except the first of the series, the magnitude of the said potential to any said rectifier being more than to its corresponding gate, and means for initiating conduction of the said first rectifier of the series.

5. A switching circuit for connecting a load to a potential source comprising two or more series connected solid state rectifiers, each rectifier being provided with a gate for initiating conduction thereof, a first voltage divider across said source arranged to apply a proportionate amount of said potential to each said rectifier, a second voltage divider through a unidirectional device across said source arranged to apply a predetermined amount of said potential to the said gate of each rectifier except the first of the series, the magnitude of the said potential to any said rectifier being more than to its corresponding gate, and means for applying potential to the gate of the said first rectifier of the series to cause it to become conductive.

6. A switching circuit for connecting a load to a potential source connecting two or more series connected solid state rectifiers, each rectifier being provided with a gate for initiating conduction thereof, a first voltage divider across said source arranged to apply a proportionate amount of said potential to each said rectifier, a second voltage divider through a unidirectional device across said source arranged to apply a predetermined amount of said potential connected through a unidirectional device to the said gate of each rectifier except the first of the series, the magnitude of the said potential to any said rectifier being more than to its corresponding gate, and means for initiating conduction of the said first rectifier of the series.

7. A switching circuit for connecting a load to a potential source connecting two or more series connected solid state rectifiers, each rectifier being provided with a gate for initiating conduction thereof, a first voltage divider across said source arranged to apply a proportionate amount of said potential to each said rectifier, a second voltage divider through a unidirectional device across said source arranged to apply a predetermined amount of said potential connected through a unidirectional device to the said gate of each rectifier except the first of the series, the magnitude of the said potential to any said rectifier being more than to its corresponding gate, and means for applying potential to the gate of the said first rectifier of the series to cause it to become conductive.

8. In a switching circuit for connecting a load to a source of potential including a plurality of series connected, solid state rectifiers, each having a gate for initiating conduction, a voltage divider across said source, means for applying biasing potential derived from said voltage divider to at least one of said rectifiers via said gates to render said rectifiers non-conductive, means for applying potential to said rectifiers derived from said voltage divider normally maintaining a rectifier conductive when conductivity once has been initiated, and means for initiating conduction of a selected rectifier.

9. In a switching circuit for connecting a load to a source of potential including a plurality of series connected, solid state rectifiers, each having a gate for initiating conduction, a voltage divider across said source, means for applying biasing potential derived from said voltage divider to at least one of said rectifiers via said gates to render said rectifiers non-conductive, means for applying potentials derived from said voltage divider across said rectifiers for maintaining conduction once established whereby the bias of a successive rectifier is removed by a preceding rectifier becoming conductive, and means for initiating conduction of a selected rectifier.

10. A switching circuit for connecting a load to a potential source comprising a plurality of series connected solid state rectifiers, each of said rectifiers being provided with a gate for initiating conduction thereof, a voltage divider across said source, unidirectional current conducting means for applying a reverse-biasing potential from said voltage divider to the gate of at least one of said rectifiers to maintain said reverse-biased rectifiers non-conductive, means for applying potentials derived from said voltage divider across said rectifiers for maintaining conduction thereof once established whereby the bias of successive rectifiers is removed upon conduction of a preceding rectifier, and means for initiating conduction of a selected rectifier.

References Cited in the file of this patent

FOREIGN PATENTS 821,766 Great Britain ____________ Oct. 14, 1959

OTHER REFERENCES

Solid State Products, Inc., publication, Bulletin D420-02, August 1959, pp. 7–9, 43, "A Survey of Some Circuit Applications of the Silicon Controlled Switch and Silicon Controlled Rectifier."